United States Patent
Teyssedre

(10) Patent No.: US 7,682,999 B2
(45) Date of Patent: Mar. 23, 2010

(54) GLASS COMPOSITION FOR PRODUCTION OF GLAZING ABSORBING ULTRAVIOLET AND INFRARED RADIATION

(75) Inventor: Laurent Teyssedre, Bourg la Reine (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 11/815,605

(22) PCT Filed: Feb. 6, 2006

(86) PCT No.: PCT/FR2006/050102

§ 371 (c)(1),
(2), (4) Date: Mar. 18, 2008

(87) PCT Pub. No.: WO2006/085022

PCT Pub. Date: Aug. 17, 2006

(65) Prior Publication Data

US 2008/0149902 A1    Jun. 26, 2008

(30) Foreign Application Priority Data

Feb. 8, 2005    (FR) .................................. 05 50362

(51) Int. Cl.
*C03C 3/095* (2006.01)
*C03C 3/078* (2006.01)
*C03C 4/08* (2006.01)

(52) U.S. Cl. ............................. 501/64; 501/55; 501/65; 501/66

(58) Field of Classification Search .................. 501/55, 501/64, 65, 66
See application file for complete search history.

(56) References Cited

U.S. PATENT DOCUMENTS 5,897,956 A    4/1999   Kijima et al.

2005/0148453 A1*    7/2005   Coster et al. .................. 501/64

FOREIGN PATENT DOCUMENTS

| EP | 0 745 566 | 12/1996 |
|---|---|---|
| FR | 2 699 526 | 6/1994 |
| JP | 2001-270735 | 10/2001 |
| JP | 2001270735 | 10/2001 |
| WO | 91/07356 | 5/1991 |
| WO | WO 94/14716 | 7/1994 |
| WO | 94/25407 | 11/1994 |
| WO | 03/051786 | 6/2003 |

* cited by examiner

*Primary Examiner*—Anthony J Green
(74) *Attorney, Agent, or Firm*—Oblon, Spivak, McClelland, Maier & Neustadt, L.L.P.

(57) ABSTRACT

Glass composition intended for the manufacture of windows that absorb ultraviolet and infrared radiation, comprising the oxides below, in contents varying within the following limits by weight:

| | |
|---|---|
| $SiO_2$ | 65-80% |
| $Al_2O_3$ | 0-5% |
| $B_2O_3$ | 0-5% |
| CaO | 5-15% |
| MgO | 0-2% |
| $Na_2O$ | 9-18% |
| $K_2O$ | 0-10% |
| BaO | 0-5% | characterized in that it additionally comprises the absorbent agents below, in contents varying within the following limits by weight:

| | |
|---|---|
| $Fe_2O_3$ (total iron) | 0.7 to 1.6% |
| $CeO_2$ | 0.1 to 1.2% |
| $TiO_2$ | 0 to 1.5% | the glass having a redox factor of 0.23 or less and containing no tungsten oxide $WO_3$.

16 Claims, No Drawings

GLASS COMPOSITION FOR PRODUCTION OF GLAZING ABSORBING ULTRAVIOLET AND INFRARED RADIATION

The invention relates to a glass composition of the soda-lime-silica type that absorbs infrared and ultraviolet radiation. More precisely, the invention relates to a glass composition for the production of flat glass products by floating on a bath of molten metal such as tin (the "float" process), these flat glass products being intended especially, but not exclusively, for forming the windshields and front side windows of a vehicle.

Automotive glazing is subject to very strict requirements. In terms of optical properties, these requirements are sometimes governed by regulations, for example as regards the light transmission of a windshield. Glazing intended for the production of a windshield must therefore have an overall light transmission factor ($TL_A$) under illuminant A of at least 75%. Glazing intended for the production of front side windows must have, under the same conditions, a $TL_A$ factor of at least 70%. The energy transmission of windows is often reduced in order to improve the thermal comfort of the user or to decrease the emission of gases harmful to the environment by reducing the consumption of vehicles fitted with air conditioners. To prevent the internal furnishings from being degraded, automobile manufacturers require that windows also have a low ultraviolet radiation transmission. Windows that have the ability to absorb both in those parts of the light spectrum corresponding to infrared and to ultraviolet therefore meet these requirements.

Such glazing is usually manufactured by the float process, which comprises the melting of batch materials and the floating of the molten glass on a bath of molten metal, generally tin, in order to form a glass ribbon. This ribbon is then cut into sheets, which may subsequently be bent or undergo a treatment to increase their mechanical properties, for example a thermal or chemical toughening treatment.

The compositions suitable for the production of float glass are generally composed of a glass matrix of the soda-lime-silica type and frequently include agents that absorb in certain regions of the optical spectrum (colorants and/or agents that absorb infrared and/or ultraviolet radiation).

The soda-lime-silica matrix conventionally used for this type of glass comprises the following constituents (in percentages by weight):

| | |
|---|---|
| $SiO_2$ | 60 to 75% |
| $Al_2O_3$ | 0 to 5% |
| BaO | 0 to 5% |
| CaO | 5 to 16% |
| MgO | 0 to 10% |
| $Na_2O$ | 10 to 20% |
| $K_2O$ | 0 to 10%. |

The optical absorbent agent most commonly used is iron, present in the glass both in ferric iron form, in which form ultraviolet radiation is absorbed, and in ferrous iron form, which absorbs mainly infrared radiation. Glasses containing only iron as optical absorbent agent usually have a green color due to the presence of the two aforementioned ionic forms: precise control of the relative quantities of ferric iron and ferrous iron (and therefore of the "redox" defined as the ratio by weight of ferrous iron expressed as FeO to the amount by weight of total iron expressed as $Fe_2O_3$) makes it possible to achieve the coloration and the optical performance that are desired.

However, it is apparent that the protection against ultraviolet radiation afforded by iron oxide alone may prove to be insufficient. To alleviate this drawback, it has been proposed to add agents to the glass matrix that absorb specifically in the UV, such as cerium oxide ($CeO_2$) or titanium oxide ($TiO_2$).

Thus, WO-A-91/07356 has proposed soda-lime-silica glass 3 to 5 mm in thickness, the infrared and ultraviolet transmission properties of which are obtained by adding 0.7 to 1.25% iron oxide, given a redox value of 0.23 to 0.29, $CeO_2$ and, optionally, $TiO_2$. The glass described consists of a conventional soda-lime-silica matrix that includes magnesium oxide in an amount greater than 3%.

EP-A-469 446 also describes standard glass with a soda-lime-silica matrix. Its optical properties are obtained by using glass with a redox of less than 0.275, with a total iron oxide content of greater than 0.85% and with a limited content of $CeO_2$, of less than 0.5%. The glass described is rich in iron oxide and oxidized, and therefore inexpensive as it exploits to the maximum the capability of ferric iron to absorb ultraviolet rays, so as to add a minimum amount of $CeO_2$. However, one drawback of oxidized glass lies in their lower absorption in the infrared, this absorption being provided by ferrous ions.

WO-A-94/14716 describes glass whose matrix composition is modified so as to give it greater absorption in the infrared and lower absorption in the visible, hence increased infrared selectivity (that is to say the ratio of light transmission to energy transmission). An essential characteristic of such a matrix is its low amount of MgO (0 to 2%). The glass described possesses a redox of between 0.28 and 0.30 and, in certain cases, has good ultraviolet absorption properties thanks to the addition of cerium oxide.

U.S. Pat. No. 6,133,179 describes the use of tungsten oxide $WO_3$ in glass having various matrices, including the modified matrix described in the aforementioned application WO-A-94/14716, so as to obtain low ultraviolet transmission values.

The aforementioned glasses have the major drawback of having a high manufacturing cost because they contain cerium oxide, possibly titanium oxide and/or tungsten oxide, these oxides being very expensive. Although present in small amounts, these oxides contribute in fact to significantly increasing the cost of the glass.

It is an object of the present invention to provide a glass composition of the soda-lime-silica type that is both inexpensive and capable of forming a glass possessing transmission properties in the visible, infrared and ultraviolet that are at least equivalent to those of known compositions that can be used as automotive glazing, especially as the windshield and front side windows of a vehicle.

It is another object of the invention to propose a glass composition capable of being processed under the conditions of the float process, by floating the glass on a bath of molten metal.

These objects are achieved according to the present invention by the composition of the soda-lime-silica type comprising the oxides below, in contents varying within the following limits by weight:

| | |
|---|---|
| $SiO_2$ | 65-80% |
| $Al_2O_3$ | 0-5% |
| $B_2O_3$ | 0-5% |
| CaO | 5-15% |
| MgO | 0-2% |
| $Na_2O$ | 9-18% |
| $K_2O$ | 0-10% |
| BaO | 0-5% | and the absorbent agents below, in contents varying within the following limits by weight:

| | |
|---|---|
| $Fe_2O_3$ (total iron) | 0.7 to 1.6% |
| $CeO_2$ | 0.1 to 1.2% |
| $TiO_2$ | 0 to 1.5%, | the glass having a redox factor of 0.23 or less and containing no tungsten oxide $WO_3$.

It should be pointed out here that the soda-lime-silica glass composition may contain, apart from the inevitable impurities, a small proportion (up to 1%) of other constituents, for example agents ($SO_3$, Cl, $Sb_2O_3$, $As_2O_3$) that help the melting or refining of the glass, or constituents deriving from a possible addition of recycled cullet into the glass batch.

Within the context of the invention, the term "redox" is understood to mean the ratio of the weight content of ferrous iron expressed in FeO form to the weight content of total iron expressed in $Fe_2O_3$ oxide form.

The glasses according to the invention have a light transmission ($TL_A$) generally of 65% or higher, for example 70%, and an energy transmission (TE) of 46% or less, or 44% or less and even 43% or less for a thickness of 3 to 5 mm. In accordance with the invention, the light transmission ($TL_A$) is defined as that calculated using illuminant A, the ultraviolet transmission (TUV) is defined as that calculated according to the ISO 9050 standard and the energy transmission (TE) is defined as that calculated using the Parry Moon (air mass=2) solar spectral distribution.

The selectivity is defined as the ratio of the light transmission ($TL_A$) to the energy transmission (TE) for a given thickness.

The composition according to the invention makes it possible to obtain a glass having a high selectivity, this being particularly advantageous when it is intended to form automotive glazing. This is because such a glass makes it possible to limit heat-up due to solar radiation and consequently to increase thermal comfort in the passenger compartment. Preferably, the selectivity of the glass for a thickness varying from 3 to 5 mm is 1.60 or higher, or 1.62, and better still 1.65 or higher.

The composition according to the invention makes it possible to obtain a glass preferably having, for a thickness varying from 3 to 5 mm, a TUV not exceeding 14%, especially 12% and even 10%.

In the glasses according to the invention, the silica $SiO_2$ is generally kept within very narrow limits for the following reasons: above about 80%, the viscosity of the glass and its ability to devitrify greatly increase, making it more difficult to melt it and to pour it onto a bath of molten tin, while below 65% the hydrolytic resistance of the glass rapidly decreases, as does also the transmission in the visible.

The alkali metal oxides $Na_2O$ and $K_2O$ facilitate melting of the glass and make it possible to adjust its viscosity at high temperature so as to keep it close to that of a standard glass. $K_2O$ may be used up to about 5%, as above this the problem of the high cost of the composition arises. Moreover, the percentage content of $K_2O$ may be increased essentially only to the detriment of $Na_2O$, which contributes to increasing the viscosity. The sum of the $Na_2O$ and $K_2O$ contents expressed as percentages by weight, is preferably at least 10% and advantageously less than 20%, especially 15% or less or even 14% or less. This is because below 15% it appears that the ferric ions have a modified chemical environment, which increases their capability of absorbing ultraviolet radiation. This compensates in particular for the absence of tungsten oxide.

Alkaline-earth metal oxides allow the viscosity of the glass to be adapted to the glass production conditions.

MgO also plays a particularly important role in the transmission properties of the glasses, owing to its effect of modifying the shape of the ferrous iron absorption band. Its content must necessarily not exceed 2%. Preferably, the MgO content of the glasses according to the invention must not exceed 1%, or even 0.5%.

CaO makes it possible to reduce the viscosity of the glass at high temperature and to increase its hydrolytic resistance. The lowering of the MgO content is preferably compensated for with the oxide CaO, rather than $SiO_2$ and $Na_2O$, for viscosity and cost reasons respectively. For these various reasons, the CaO content is preferably 9% or higher, and more preferably 10.5% or higher.

BaO makes it possible to increase the light transmission and it can be added to the composition according to the invention with a content of less than 5%. BaO has a much weaker influence than MgO and CaO on the viscosity of the glass and the increase in its content is essentially made to the detriment of the alkali metal oxides, MgO and in particular CaO. Any large increase in BaO therefore contributes to increasing the viscosity of the glass, especially at low temperatures. Preferably, the glasses according to the invention contain no BaO.

Apart from respecting the limits defined above for the variation in the content of each alkaline-earth metal oxide, it is preferable, in order to obtain the desired transmission properties, to limit the sum of the percentages by weight of MgO, CaO and BaO to a value of 15% or less.

By using the absorbent agents within the limits of the invention it is possible for the optical properties of the glass to be optimally adjusted and for the desired performance to be achieved.

As indicated above, iron oxide is present in the form of ferric or ferrous ions. The ferric ions absorb in the ultraviolet and give a slight yellow-to-green color, whereas the ferrous ions absorb strongly in the infrared, while giving the glass a blue color. The redox plays a key role in obtaining the properties of the glass of the present invention. Under the redox conditions usually employed within the context of a float installation, and in the absence of other colorants, the glasses containing iron oxide have a green color as already explained. The optical properties of ferrous iron are due to an absorption band having its maximum absorption around a wavelength ranging from 1000 to 1100 nm (and therefore in the infrared range) and extending into the range of visible wavelengths. The effect of modifying the glass matrix as described in application WO-A-94/14716, and especially the effect of reducing the MgO content in the glass matrix, is to modify the shape of this absorption band, in particular shifting it toward the infrared. This results in glasses having higher infrared selectivity, i.e. a lower energy transmission than that of glasses with a standard matrix, for an equivalent light transmission.

The inventors have surprisingly discovered that by producing the glass with a modified matrix under oxidizing conditions (with a redox of 0.23 or less and preferably of 0.19 or less) with a particular iron content, it is possible to obtain glasses having light, energy and ultraviolet transmission properties similar to those of glasses with a standard matrix, but more economically as it is unnecessary to use as large an amount of cerium oxide and/or titanium oxide. The effect of the matrix composition, especially the low MgO content, on obtaining optical properties of the same degree as those exhibited by a conventional glass using a lower content of cerium and/or titanium oxides has proven to be quite unexpected.

According to the invention, the iron oxide content may vary from 0.7 to 1.6%. When the content is less than 0.7%, the transmission of the glasses obtained is too high, especially in the infrared and ultraviolet ranges. A content of greater than 1.6% does not provide a light transmission that meets the regulatory requirements for use as an automobile windshield or front side window. Furthermore, the melting of such compositions with a high iron content is made difficult, especially when it is carried out in an open-flame furnace owing to the presence of a large quantity of ferrous iron, the latter being responsible for too low a transmission of the radiation emitted by the flames in the glass bath. Preferably, the iron oxide content of the glasses according to the invention is at least 0.8%, but advantageously at most 1.3% and better still at most 0.95%.

The redox of the glass is maintained at a value of 0.23 or less, for example 0.19, for reasons associated essentially with the optical properties of the glasses obtained, but also with the melting and refining of the glass. To control the redox, it is possible to use known oxidizing agents, such as sodium sulfate, and/or reducing agents such as coke in a suitable amount. The economic advantage of the glasses according to the invention is at its optimum when the glasses are oxidized, since the main UV absorbent agent is then ferric iron. Another advantage of using oxidized glasses in the production of glazing with a low UV transmission stems from the fact that the thermal toughening very significantly reduces the TUV of the glazing, this being the more so the higher the ferric iron content of the glass. The redox of the glasses according to the invention is therefore maintained preferably at contents of 0.19 or less, more preferably 0.18 or less. Since highly oxidized glasses are more difficult to refine and have a yellow tint undesirable for esthetic reasons, the redox of the glasses according to the invention is preferably maintained at above 0.12, preferably above 0.15.

Cerium oxide CeO2, present in the glass in the form of $Ce^{3+}$ and $Ce^{4+}$ ions, is advantageous as it exhibits low absorption in the visible. Owing to its high cost, $CeO_2$ contents not exceeding 0.9% or 0.7%, and better still not exceeding 0.5%, are preferred.

Titanium oxide $TiO_2$ plays a similar role to cerium oxide when it is in the presence of ferrous oxide FeO. Although the maximum content provided within the context of the invention may reach 1.5%, it is preferable for it not to exceed 0.1% in order to prevent the appearance of a yellow coloration. Such a value corresponds to the content usually encountered owing to the degree of purity of the batch materials employed (inevitable impurities). Advantageously, the glass composition according to the invention contains no titanium oxide.

The glass composition according to the invention may also contain other colorants for adjusting the tint of the glass. As an example, mention may be made of the colorants chosen from transition elements such as $CoO$, $Cr_2O_3$, $NiO$, $Se$, $V_2O_5$, $CuO$, or else from rare-earth oxides, such as $Er_2O_3$, $La_2O_3$, $Nd_2O_3$. In particular to compensate for the possible yellow color due to the presence of $TiO_2$ and/or to significant oxidation of the glass, it is possible to use up to 10 ppm of cobalt oxide CoO and/or up to 50 ppm of copper oxide CuO. In general, the total content of these colorants is less than 0.1% and most often the composition contains no other colorants than iron oxide and cerium oxide.

One particularly suitable composition for producing a relatively thin glass sheet, with a thickness of around 3.15 mm, includes the absorbent agents below within the following limits by weight:

| | |
|---|---|
| $Fe_2O_3$ (total iron) | 1.0 to 1.4% |
| $CeO_2$ | 0.4 to 1.2%. |

Such a composition possesses a redox ranging from 0.15 to 0.22, preferably 0.15 to 0.19, and makes it possible to obtain a glass having, for a thickness of 3.15 mm, a light transmission $TL_A$ of greater than 70%, an ultraviolet transmission of less than 12% and a selectivity of greater than 1.62. This thin glass pane may be paired with a another clear glass pane and the combination can then be laminated to form a laminated glass having a light transmission $TL_A$ of greater than 70%.

Another composition particularly suitable for producing a glass sheet with a thickness of around 3.85 mm, useful for forming automotive glazing, includes the absorbent agents below within the following limits by weight:

| | |
|---|---|
| $Fe_2O_3$ (total iron) | 0.85 to 1.2% |
| $CeO_2$ | 0.4 to 1%. |

Such a composition possesses a redox ranging from 0.16 to 0.22, preferably 0.16 to 0.19, and makes it possible to obtain a glass having, for a thickness of 3.85 mm, a light transmission $TL_A$ of greater than 70%, an ultraviolet transmission of less than 12% and a selectivity of greater than 1.62.

Another composition particularly suitable for the production of a glass sheet with a thickness of around 4.85 mm, useful for forming windows for trucks or buses, includes the absorbent agents below within the following limits by weight:

| | |
|---|---|
| $Fe_2O_3$ (total iron) | 0.7 to 0.95% |
| $CeO_2$ | 0.3 to 1%. |

Such a composition possesses a redox ranging from 0.18 to 0.22, preferably 0.18 to 0.19, and makes it possible to obtain a glass having, for a thickness of 4.85 mm, a light transmission $TL_A$ of greater than 70%, an ultra-violet transmission of less than 12% and a selectivity of greater than 1.62.

The glass composition according to the invention can be melted under the conditions for the production of float glass. The melting generally takes place in open-flame furnaces, possibly provided with electrodes for heating the glass in the bulk by passing an electrical current between the two electrodes. To facilitate melting, and especially to make this mechanically useful, the glass composition advantageously has a temperature corresponding to a viscosity η such that log η=2 which is less than 1500° C., preferably a temperature corresponding to a viscosity η, expressed in poise, such that log η=3.5 (this temperature being denoted by $T_{log\ \eta=3.5}$) and a liquidus temperature (denoted by $T_{liq}$) which satisfy the equation:

$$T_{log\ \eta=3.5} T_{liq} > 20°\ C.,$$

and preferably the equation:

$$T_{log\ \eta=3.5} T_{liq} > 50°\ C.$$

The subject of the invention is also a window, especially for an automobile, comprising at least one glass sheet having the composition according to the invention.

A better appreciation of the advantages of the present invention will be gained from the examples of glass compositions given below.

In these examples, the values of the following properties, calculated for a given thickness using an experimental spectrum, are indicated:

- the overall light transmission factor ($TL_A$) under illuminant A, calculated between 380 and 780 nm. This calculation is carried out taking into consideration illuminant A, as defined by the ISO/CIE 10526 standard and the CIE 1931 calorimetric reference observer, as defined by the ISO/CIE 10527 standard;
- the overall energy transmission factor (TE) integrated between 295 and 2500 nm according to the ISO 9050 standard (Parry Moon, air mass 2);
- the selectivity (SE), defined as the ratio of the total light transmission ($TL_A$) under illuminant A to the total energy transmission (TE);
- the ultraviolet transmission factor (TUV), calculated using the glass transmission spectrum between 290 and 380 nm according to the ISO 9050 standard; and
- the redox, defined as being the ratio of the mass content of ferrous iron (expressed as FeO) to the mass content of total iron (expressed as $Fe_2O_3$).

To determine the redox, the total iron ($Fe_2O_3$) content is measured by X-ray fluorescence and the ferrous iron (FeO) content is measured by wet chemistry, or calculated from the transmission spectrum using the Beer-Lambert law.

Example 1 (according to the invention) and Example C2 (comparative example) in Table 1 illustrate the advantage of the glasses according to the invention in terms of $CeO_2$ savings compared to glasses with a standard matrix. The two glasses have the same optical properties ($TL_A$=71.1%; TE=43.9%; TUV=10.9%) for a thickness of 3.5 mm, these three quantities determining unequivocally the choice of the three characteristics of the composition, namely the total iron $Fe_2O_3$ content, the redox and the $CeO_2$ content. It is clearly apparent that the example according to the invention is much less expensive than the comparative example, the amount of $CeO_2$ added to achieve the desired TUV being less than half. For equivalent optical properties, the glass according to the invention is richer in iron, more oxidized and less expensive than the glass with a standard matrix.

TABLE 1

|  | 1 | C2 |
|---|---|---|
| $SiO_2$(%) | 73.47 | 70.61 |
| $Al_2O_3$(%) | 0.64 | 0.6 |
| CaO(%) | 9.48 | 8.6 |
| MgO(%) | 0.20 | 3.8 |
| $Na_2O$(%) | 13.6 | 13.9 |
| $K_2O$(%) | 0.35 | 0.3 |
| $Fe_2O_3$(%) | 1.23 | 0.91 |
| Redox | 0.18 | 0.26 |
| $CeO_2$(%) | 0.50 | 1.28 |

Tables 2, 3 and 4 are examples of glass compositions according to the invention that are particularly suitable for use as automotive glazing, with thicknesses of 3.85 mm, 3.15 mm and 4.85 mm, respectively.

Each of the compositions indicated in these tables was produced from the following glass matrix, the contents of which are expressed in percentages by weight, the matrix being corrected in terms of silica in order to be adapted to the total content of absorbent agents added:

| | |
|---|---|
| $SiO_2$ | 75.20% |
| $SO_3$ | 0.30% |
| $Al_2O_3$ | 0.64% |
| CaO | 9.48% |
| MgO | 0.20% |
| $Na_2O$ | 13.60% |
| $K_2O$ | 0.35%. |

The glasses obtained from the compositions according to the invention are compatible with the usual techniques for manufacturing flat glass. The thickness of the glass ribbon obtained by forming a sheet of molten glass on a bath of tin may vary between 0.8 and 10 mm, preferably between 3 and 5 mm, in the case of automotive glazing and between 5 and 10 mm in the case of architectural glazing.

The glazing obtained by cutting the glass ribbon may subsequently undergo a bending and/or toughening operation, especially for forming automotive glazing. It may also undergo other subsequent treatment operations, for example with the aim of coating it with one or more layers of metal oxides for the purpose of reducing its heat-up by solar radiation and consequently to reduce the heat-up of the passenger compartment of a vehicle provided therewith.

TABLE 2

| (3.85 mm glass) | | | | | | | | | | | |
|---|---|---|---|---|---|---|---|---|---|---|---|
| | 3 | 4 | 5 | 6 | 7 | 8 | 9 | 10 | 11 | 12 | 13 |
| $Fe_2O_3$ (%) | 1.10 | 1.13 | 0.96 | 1.17 | 1.27 | 1.35 | 1.48 | 0.87 | 1.04 | 1.07 | 0.98 |
| Redox | 0.20 | 0.19 | 0.23 | 0.18 | 0.17 | 0.19 | 0.15 | 0.22 | 0.19 | 0.19 | 0.21 |
| $CeO_2$ (%) | 0.45 | 0.85 | 0.60 | 0.60 | 0.55 | 0.25 | 0.31 | 0.85 | 0.65 | 0.85 | 0.75 |
| $TL_A$ (%) | 70.7 | 70.5 | 71.6 | 70.4 | 69.5 | 66.9 | 67.9 | 73.6 | 72.2 | 71.6 | 72.1 |
| TE (%) | 42.8 | 42.7 | 43.5 | 42.7 | 42.0 | 38.1 | 40.6 | 46.6 | 45.3 | 44.2 | 44.5 |
| TUV (%) | 11.8 | 9.5 | 13.3 | 9.9 | 8.7 | 9.2 | 6.9 | 13.1 | 11.5 | 10.2 | 12.0 |
| Selectivity | 1.65 | 1.65 | 1.65 | 1.65 | 1.66 | 1.76 | 1.67 | 1.58 | 1.60 | 1.62 | 1.62 |

TABLE 3

(3.15 mm glass)

| | 14 | 15 | 16 | 17 | 18 | 19 | 20 | 21 | 22 | 23 |
|---|---|---|---|---|---|---|---|---|---|---|
| $Fe_2O_3$ (%) | 1.36 | 1.40 | 1.43 | 1.11 | 1.51 | 1.58 | 1.34 | 1.29 | 1.27 | 1.05 |
| Redox | 0.20 | 0.19 | 0.20 | 0.23 | 0.18 | 0.17 | 0.20 | 0.19 | 0.20 | 0.22 |
| $CeO_2$ (%) | 0.40 | 0.59 | 0.47 | 0.95 | 0.30 | 0.80 | 0.65 | 0.57 | 0.98 | 0.98 |
| $TL_A$ (%) | 70.2 | 70.2 | 69.3 | 72.2 | 68.8 | 68.2 | 70.3 | 71.9 | 71.4 | 73.6 |
| TE (%) | 42.3 | 42.6 | 41.2 | 44.4 | 41.4 | 40.8 | 42.3 | 45.0 | 44.0 | 46.8 |
| TUV (%) | 11.2 | 9.8 | 10.0 | 12.3 | 9.2 | 7.0 | 10.5 | 11.2 | 10.0 | 12.8 |
| Selectivity | 1.66 | 1.65 | 1.68 | 1.63 | 1.66 | 1.66 | 1.66 | 1.60 | 1.62 | 1.57 |

TABLE 4

(4.85 mm glass)

| | 24 | 25 | 26 | 27 | 28 | 29 | 30 | 31 | 32 | 33 |
|---|---|---|---|---|---|---|---|---|---|---|
| $Fe_2O_3$ (%) | 0.88 | 0.92 | 0.95 | 1.02 | 1.05 | 0.80 | 1.14 | 0.86 | 0.82 | 0.83 |
| Redox | 0.20 | 0.19 | 0.19 | 0.17 | 0.20 | 0.21 | 0.16 | 0.19 | 0.22 | 0.19 |
| $CeO_2$ (%) | 0.54 | 0.70 | 0.35 | 0.75 | 0.42 | 0.74 | 0.30 | 0.9 | 0.41 | 0.65 |
| $TL_A$ (%) | 70.7 | 70.7 | 69.8 | 69.8 | 67.5 | 71.8 | 68.3 | 71.5 | 70.9 | 72.4 |
| TE (%) | 42.5 | 42.8 | 41.5 | 42.2 | 38.5 | 43.8 | 40.6 | 43.9 | 42.5 | 45.3 |
| TUV (%) | 11.4 | 9.8 | 11.5 | 8.1 | 9.5 | 11.5 | 8.4 | 9.7 | 13.6 | 11.4 |
| Selectivity | 1.66 | 1.65 | 1.68 | 1.65 | 1.75 | 1.64 | 1.68 | 1.63 | 1.67 | 1.60 |

The invention claimed is:

1. A glass composition intended for the manufacture of windows that absorb ultraviolet and infrared radiation, comprising (i) the following oxides in contents varying within the following limits by weight:

| | |
|---|---|
| $SiO_2$ | 65-80% |
| $Al_2O_3$ | 0-5% |
| $B_2O_3$ | 0-5% |
| CaO | 5-15% |
| MgO | 0-2% |
| $Na_2O$ | 9-18% |
| $K_2O$ | 0-10% |
| BaO | 0-5%. | and (ii) the following absorbent agents in contents varying within the following limits by weight:

| | |
|---|---|
| $Fe_2O_3$ (total iron) | 0.7 to 1.6% |
| $CeO_2$ | 0.1 to 1.2% |
| $TiO_2$ | 0 to 1.5%. | said glass composition having a redox factor of 0.19 or less and containing no tungsten oxide $WO_3$, wherein $T_{uv}$ does not exceeding 14% for a thickness varying from 3 to 5 mm.

2. The glass composition as claimed in claim 1, wherein said glass composition has a light transmission ($TL_A$) of 65% or higher for a thickness of 3 to 5 mm.

3. The glass composition as claimed in claim 1, wherein said glass composition has an energy transmission (TE) of 46% or less for a thickness of 3 to 5 mm.

4. The glass composition as claimed in claim 1, wherein a selectivity of said glass composition for a thickness varying from 3 to 5 mm is 1.60 or higher.

5. The glass composition as claimed in claim 1, wherein the sum of contents of sodium and potassium oxides ($Na_2O+K_2O$) is 15% or less.

6. The glass composition as claimed in claim 1, wherein a $CeO_2$ content does not exceed 0.9%.

7. The glass composition as claimed in claim 1, containing no titanium oxide.

8. The glass composition as claimed in claim 1, wherein an iron oxide content is at least 0.8% and at most 1.3%.

9. The glass composition as claimed in claim 1, comprising:

| | |
|---|---|
| $Fe_2O_3$ (total iron) | 1.0 to 1.4% |
| $CeO_2$ | 0.4 to 1.2%. | and possessing a redox ranging from 0.15 to 0.19.

10. The glass composition as claimed in claim 9, having a light transmission $TL_A$ greater than 70%, an ultraviolet transmission less than 12% and a selectivity greater than 1.62 for a thickness of about 3.15 mm.

11. The glass composition as claimed in claim 1, comprising:

| | |
|---|---|
| $Fe_2O_3$ (total iron) | 0.85 to 1.2% |
| $CeO_2$ | 0.4 to 1%, | and possessing a redox ranging from 0.16 to 0.19.

12. The glass composition as claimed in claim 11, having a light transmission $TL_A$ greater than 70%, an ultraviolet transmission less than 12% and a selectivity greater than 1.62 for a thickness of about 3.15 mm.

13. The glass composition as claimed in claim 1, comprising:

| | |
|---|---|
| $Fe_2O_3$ (total iron) | 0.7 to 0.95% |
| $CeO_2$ | 0.3 to 1%, | and possessing a redox ranging from 0.18 to 0.19.

14. The glass composition as claimed in claim 13, having a light transmission $TL_A$ greater than 70%, an ultraviolet transmission less than 12% and a selectivity greater than 1.62 for a thickness of about 4.85 mm.

15. A glass sheet prepared from the composition as claimed in claim 1.

16. A window for an automobile, comprising at least one glass sheet having the composition as claimed in claim 1.

* * * * *